US012680477B1

(12) United States Patent
Sanzari

(10) Patent No.: US 12,680,477 B1
(45) Date of Patent: Jul. 14, 2026

(54) TURBINE EXHAUST DUCT

(71) Applicant: Pratt & Whitney Canada Corp.,
Longueuil (CA)

(72) Inventor: Lorenzo Sanzari, Montreal (CA)

(73) Assignee: Pratt & Whitney Canada Corp.,
Longueuil (CA)

( * ) Notice: Subject to any disclaimer, the term of this
patent is extended or adjusted under 35
U.S.C. 154(b) by 0 days.

(21) Appl. No.: 19/080,423

(22) Filed: Mar. 14, 2025

(51) Int. Cl.
*F01D 25/30* (2006.01)
*F02C 7/00* (2006.01)
(52) U.S. Cl.
CPC ............... *F01D 25/30* (2013.01); *F02C 7/00*
(2013.01); *F05D 2220/32* (2013.01); *F05D*
*2220/323* (2013.01); *F05D 2240/14* (2013.01)
(58) Field of Classification Search
CPC ........ F01D 25/30; F02C 7/00; F05D 2220/32;
F05D 2220/323; F05D 2240/14
See application file for complete search history.

(56) References Cited

U.S. PATENT DOCUMENTS

| | | | | |
|---|---|---|---|---|
| 6,092,361 | A * | 7/2000 | Romani | .................... F02C 3/10 |
| | | | | 60/39.511 |
| 6,971,842 | B2 | 12/2005 | Luniewski | |
| 12,331,686 | B1 * | 6/2025 | Chandler | ................ F02C 7/141 |
| 2016/0341633 | A1 * | 11/2016 | Ouyang | ................ G01M 15/14 |
| 2021/0231021 | A1 * | 7/2021 | Maurya | .................... F01D 9/06 |

FOREIGN PATENT DOCUMENTS

CN 219277798 U 6/2023

* cited by examiner

*Primary Examiner* — Hoang M Nguyen
(74) *Attorney, Agent, or Firm* — Getz Balich LLC

(57) ABSTRACT
A turbine exhaust duct for a gas turbine engine is provided
that includes an exhaust manifold, an outer duct, first and
second connecting panels, a first stiffener panel, and a
second stiffener panel. The exhaust manifold includes an
annular inlet and first and second exhaust ports. The outer
duct includes a wall panel, an axial end aperture, a first
lateral side aperture, and a second lateral side aperture. The
first connecting panel includes a first exhaust port connect-
ing flange and a first lateral side outer duct flange. The first
stiffener panel has a periphery flange that is attached to the
first connecting panel and to the outer duct wall panel. The
second stiffener panel has a periphery flange that is attached
to the first connecting panel and to the outer duct wall panel.

20 Claims, 9 Drawing Sheets

TURBINE EXHAUST DUCT

BACKGROUND OF THE INVENTION

1. Technical Field

The application relates to gas turbine engines in general, and to turbine exhaust ducts for gas turbine engines in particular.

2. Background Information

Turboprops are gas turbine engines coupled to a propeller via a reduction gearbox. Contrary to a turbofan engine, in which energy from the jet is used to generate thrust, a turboprop turbine converts this energy in mechanical energy. The turbine is then used to drive the propeller. However, the rotational speed of the turbine is too high to be directly coupled to the propeller. Accordingly, a reduction gearbox is used to reduce the rotational speed of the propeller relative to the turbine and to increase the torque generated by the turbine. Gearboxes add weight and complexity to the engine, and room for improvement exists.

SUMMARY

According to an aspect of the present disclosure, a turbine exhaust duct for a gas turbine engine is provided. The turbine exhaust duct includes an exhaust manifold, an outer duct, a first connecting panel, a second connecting panel, at least one first stiffener panel, and at least one second stiffener panel. The exhaust manifold includes an annular inlet disposed at a first axial end of the exhaust manifold, a first exhaust port disposed on a first lateral side of the exhaust manifold, and a second exhaust port disposed on a second lateral side of the exhaust manifold. The outer duct includes a wall panel that extends axially between a first axial flange and a second axial flange, an axial end aperture disposed adjacent the first axial flange, a first lateral side aperture disposed in the wall panel, and a second lateral side aperture disposed in the wall panel. The first connecting panel includes a first exhaust port connecting flange and a first lateral side outer duct flange. The first exhaust port connecting flange is attached to the first exhaust port, and the first lateral side outer duct flange is attached to the outer duct wall panel. The second connecting panel includes a second exhaust port connecting flange and a second lateral side outer duct flange. The second exhaust port connecting flange is attached to the second exhaust port, and the second lateral side outer duct flange is attached to the outer duct wall panel. The first stiffener panel (FSP) has a FSP periphery flange that is attached to the first connecting panel and to the outer duct wall panel. The second stiffener panel (SSP) has a SSP periphery flange that is attached to the first connecting panel and to the outer duct wall panel.

In any of the aspects or embodiments described above and herein, the first exhaust port and the second exhaust port may be disposed laterally opposite one another, and the exhaust manifold may be configured to direct gas flow received by the annular inlet into both the first exhaust port and the second exhaust port, and the annular inlet of the exhaust manifold may be received within the axial end aperture. The first exhaust port may be received within the first lateral side aperture, and the second exhaust port may be received within the second lateral side aperture.

In any of the aspects or embodiments described above and herein, the at least one first stiffener panel may include an upper first stiffener panel and a lower first stiffener panel, and the upper first stiffener panel and the lower first stiffener panel may be disposed on opposite circumferential sides of the first exhaust port.

In any of the aspects or embodiments described above and herein, the at least one second stiffener panel may include an upper second stiffener panel and a lower second stiffener panel, and the upper second stiffener panel and the lower second stiffener panel may be disposed on opposite circumferential sides of the second exhaust port.

In any of the aspects or embodiments described above and herein, the FSP periphery flange may include an axial segment, a side segment, and an exhaust port segment. The axial segment and the side segment may be attached to the outer duct wall panel. The exhaust port segment may be attached to the first connecting panel.

In any of the aspects or embodiments described above and herein, the axial segment and the side segment may be disposed along a periphery of the at least one first stiffener panel.

In any of the aspects or embodiments described above and herein, the at least one first stiffener panel further may include a fastener flange engaged with the second axial flange of the outer duct.

In any of the aspects or embodiments described above and herein, the at least one first stiffener panel may include a fastener flange engaged with the first axial flange of the outer duct.

In any of the aspects or embodiments described above and herein, the FSP periphery flange may include an axial segment and an exhaust port segment, and the at least one first stiffener panel may include a first fastener flange and a second fastener flange. The axial segment may be attached to the outer duct wall panel. The exhaust port segment may be attached to the first connecting panel. The first fastener flange may be engaged with the first axial flange of the outer duct, and the second fastener flange may be engaged with the second axial flange of the outer duct.

In any of the aspects or embodiments described above and herein, the at least one first stiffener panel may be configured such that an internal cavity is defined by the at least one first stiffener panel, the outer duct, and the first connecting panel.

According to an aspect of the present disclosure, a turbine exhaust duct for a gas turbine engine is provided that includes an exhaust manifold, an outer duct, a first connecting panel, a second connecting panel, at least one first stiffener panel, and at least one second stiffener panel. The exhaust manifold is disposed within the interior compartment of the outer duct so that the first exhaust port extends laterally outward from a first lateral side of the outer duct and the second exhaust port extends laterally outward from a second lateral side of the outer duct. The first connecting panel extends between and is attached to the first exhaust port and the outer duct wall panel. The second connecting panel extends between and is attached to the second exhaust port and the outer duct wall panel. The at least one first stiffener panel has a periphery flange that is attached to the first connecting panel and to the outer duct wall panel. The at least one second stiffener panel has a periphery flange that is attached to the first connecting panel and to the outer duct wall panel.

According to an aspect of the present disclosure, a gas turbine engine is provided that includes a compressor, a combustor, a turbine, and a turbine exhaust duct. The turbine is in communication with the compressor. The turbine exhaust duct is disposed downstream of the turbine. The turbine exhaust duct includes an exhaust manifold, an outer duct, a first connecting panel, a second connecting panel, at least one first stiffener panel, and at least one second stiffener panel. The exhaust manifold is disposed within the interior compartment of the outer duct so that the first exhaust port extends laterally outward from a first lateral side of the outer duct and the second exhaust port extends laterally outward from a second lateral side of the outer duct. The first connecting panel extends between and is attached to the first exhaust port and the outer duct wall panel. The second connecting panel extends between and is attached to the second exhaust port and the outer duct wall panel. The at least one first stiffener panel (FSP) has a FSP periphery flange that is attached to the first connecting panel and to the outer duct wall panel. The at least one second stiffener panel (SSP) has a SSP periphery flange that is attached to the first connecting panel and to the outer duct wall panel.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. The following description and drawings are intended to be exemplary in nature and non-limiting.

DETAILED DESCRIPTION

Figure 1:
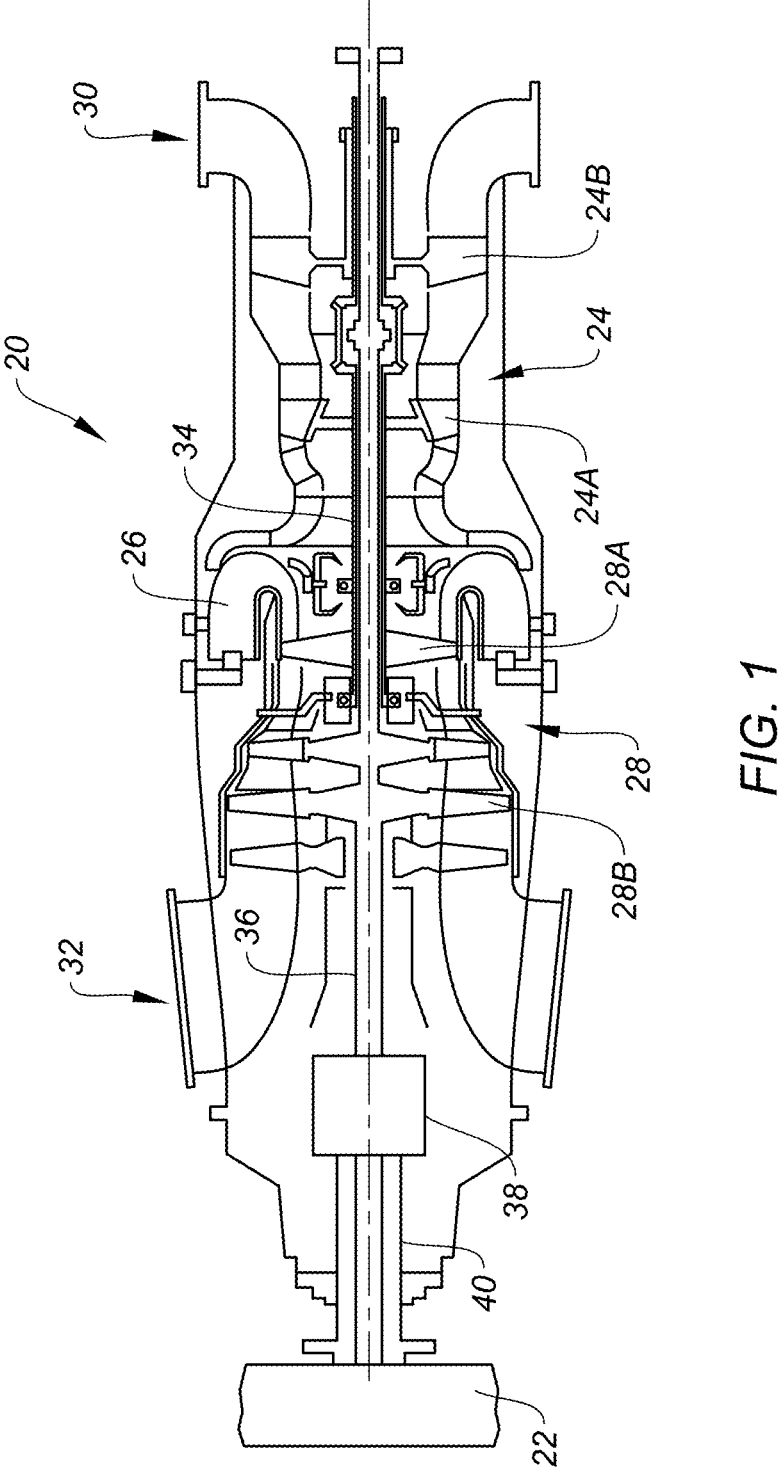
FIG. 1 is a schematic cross-sectional view of a gas turbine engine embodiment.

FIG. 1 diagrammatically illustrates a gas turbine engine 20 configured for driving a load 22, such as, but not limited to, a propeller or a helicopter rotor. Depending on the intended use, the engine 20 may be any suitable aircraft engine, and may be configured as a turboprop engine or a turboshaft engine. The gas turbine engine 20 generally comprises in serial flow communication a compressor section 24 for compressing inlet air, a combustor 26 in which the compressed air is mixed with fuel and ignited for generating an annular stream of hot combustion gases, and a turbine section 28 for extracting energy from the combustion gases.

The exemplary engine 20 embodiment shown in FIG. 1 is a "reverse-flow" engine because gases flow from the inlet 30, at an axially aft portion of the engine 20, to the dual port exhaust outlet 32, at an axially forward portion of the engine 20. This is in contrast to "through-flow" gas turbine engines in which gases flow through the core of the engine 20 from an axial forward end to an axial aft end. The gas turbine engine 20 diagrammatically shown in FIG. 1 is an example provided to facilitate the description herein. The present disclosure is not limited to any particular gas turbine engine configuration.

The turbine section 28 of the gas turbine engine 20 shown in FIG. 1 includes a high-pressure turbine 28A in communication with a high-pressure compressor 24A via a high-pressure shaft 34, and a low-pressure turbine 28B in communication with a low-pressure compressor 24B via a low-pressure shaft 36. A reduction gearbox 38 is configured to connect the low-pressure shaft 36 to an output shaft 40 that is in driving engagement with a load 22 (e.g., a propeller, a helicopter rotor, or the like) while providing a reduction speed ratio therebetween.

Figure 2:
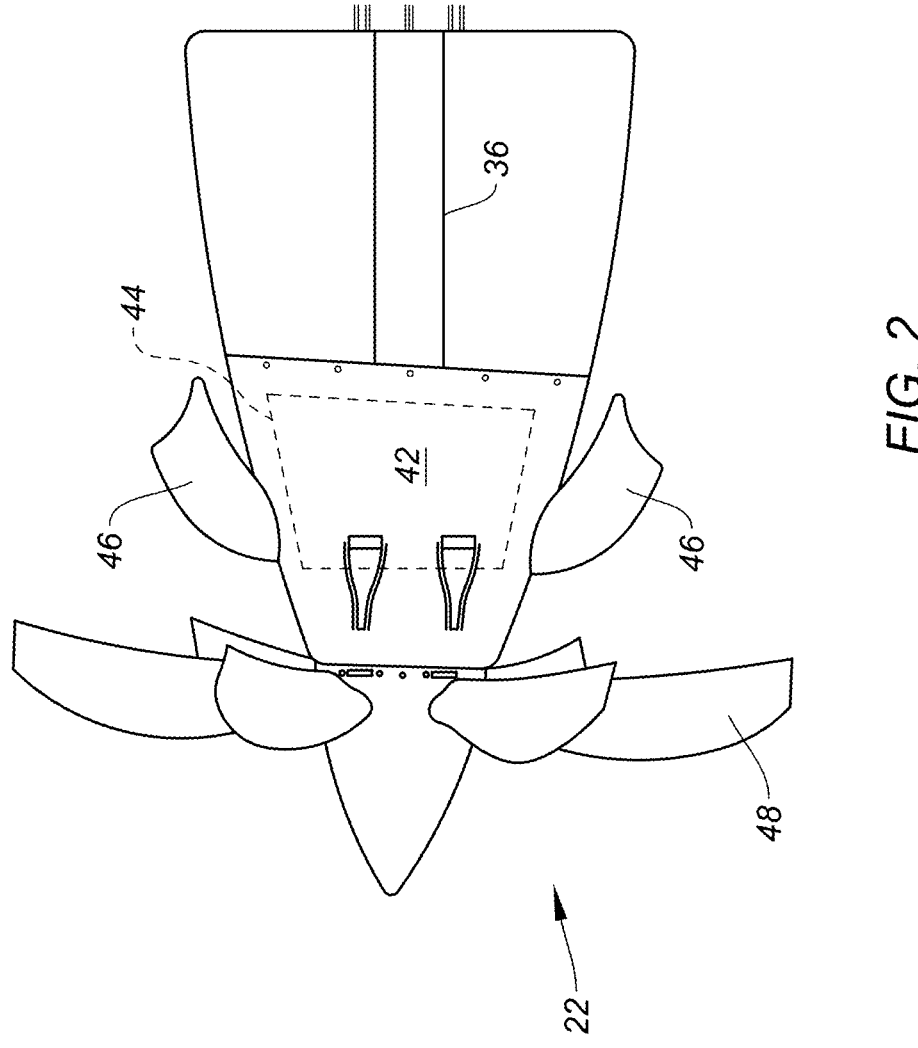
FIG. 2 diagrammatically illustrates a portion of a turbo-prop engine disposed within an aircraft structure.
Figures 3, 4:
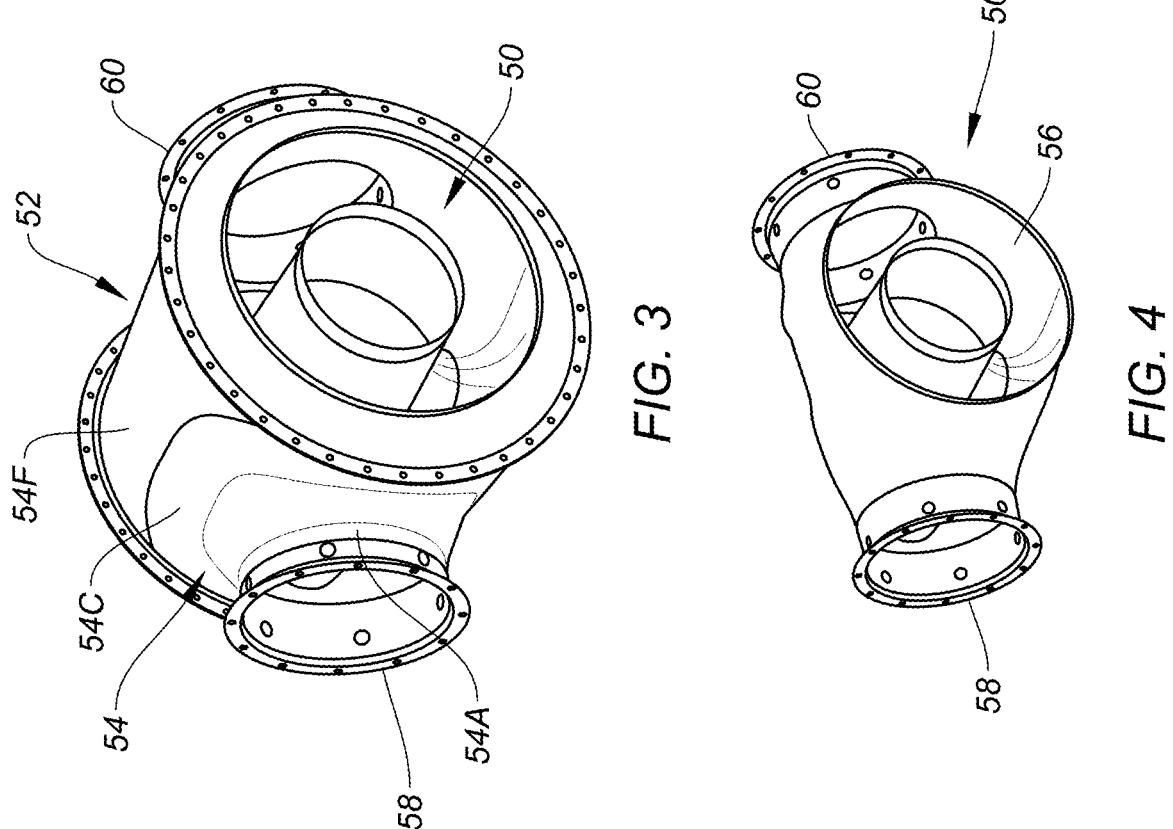
FIG. 3 diagrammatically illustrates a turbine exhaust duct embodiment.
FIG. 4 diagrammatically illustrates an exhaust manifold embodiment.

FIG. 2 diagrammatically illustrates a portion of a turbo-prop engine 20 disposed within an aircraft 42. The aircraft 42 encloses a turbine exhaust duct 44 portion of the engine 20; e.g., shown diagrammatically by dashed line because the turbine exhaust duct 44 is hidden in this view. As detailed below, FIG. 3 illustrates an embodiment of a turbine exhaust duct 44. A pair of aircraft exhaust stacks 46 are in communication with the turbine exhaust duct 44. The exhaust stacks 46 are disposed downstream of a propeller 48; i.e., the load 22 driven by the engine 20. The exhaust stacks 46 direct gases that exited the turbine section 28 of the engine 20 and passed through the turbine exhaust duct 44.

FIG. 3 illustrates a turbine exhaust duct 44 embodiment that may be disposed radially inside of the engine housing 42 shown in FIG. 2. The turbine exhaust duct 44 is configured to receive exhaust gas flow from the turbine section 28 (i.e., the turbine exhaust duct 44 is disposed downstream of the turbine section 28) and direct the exhaust gas flow outside of the engine 20. In the example shown in FIG. 2, the turbine exhaust duct 44 directs the exhaust into exhaust stacks 46 that extend out from the engine housing 42. The turbine exhaust duct 44 includes an exhaust manifold 50, an outer duct 52, and lateral side connecting panels (i.e., first lateral side connecting panel 54 and second lateral side connecting panel 55; sometimes referred to as "doublers").

FIG. 4 illustrates an exhaust manifold 50 embodiment like that included in the turbine exhaust duct 44 shown in FIG. 3. The exhaust manifold 50 includes an annular inlet 56, a first exhaust port 58, and a second exhaust port 60. The first and second exhaust ports 58, 60 are disposed on opposite lateral sides of the exhaust manifold 50. The annular inlet 56 is disposed at a forward end of the exhaust manifold 50. The exhaust manifold 50 is configured to receive a generally axial flow of exhaust gas from the turbine section 28, split the flow, and turn it laterally toward a respective exhaust port 58, 60.

Figures 5, 6:
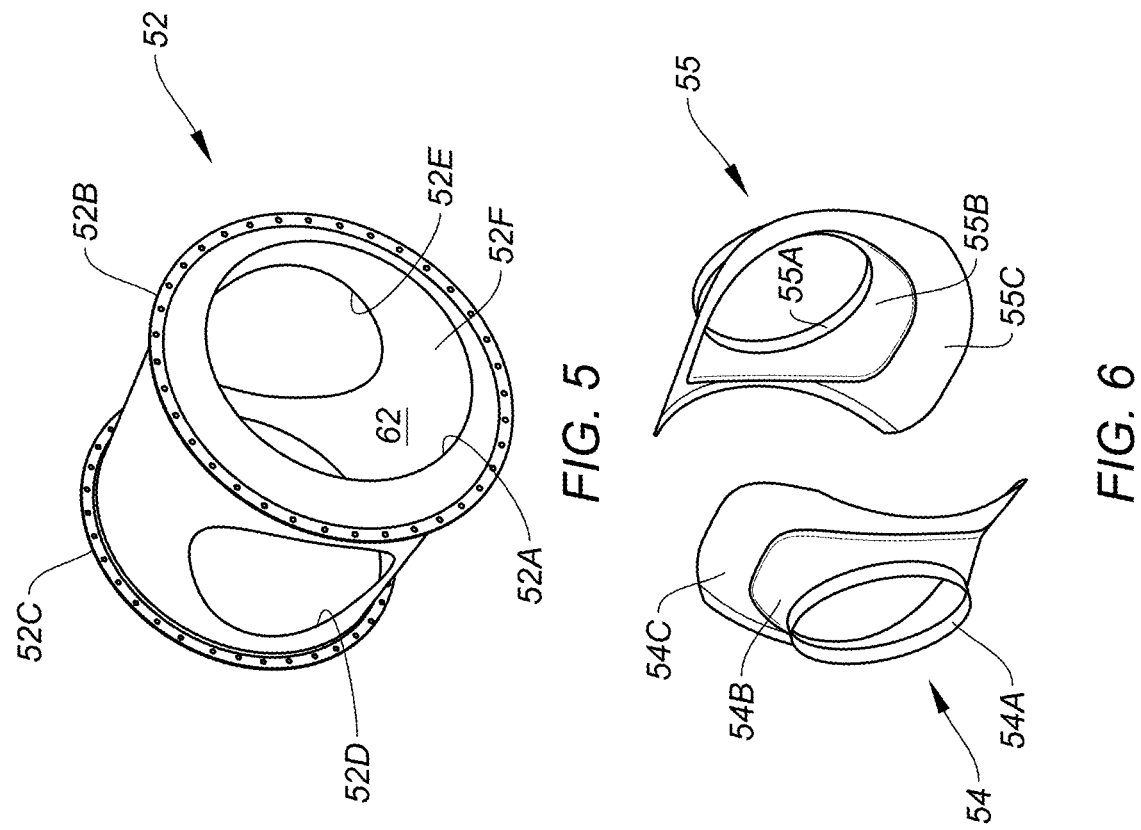
FIG. 5 diagrammatically illustrates an outer duct embodiment.
FIG. 6 diagrammatically illustrates connecting panel embodiments.

FIG. 5 illustrates the outer duct 52 that is disposed outside of the exhaust manifold 50; i.e., the exhaust manifold 50 may be described as being disposed within an interior compartment 62 of the outer duct 52. The outer duct 52 includes a forward opening 52A, a forward flange 52B, a rear flange 52C, a first lateral side opening 52D, and a second lateral side opening 52E. The first lateral side opening 52D and the second lateral side opening 52E are disposed in a wall panel 52F that extends axially between the forward flange 52B and the rear flange 52C. The forward opening 52A is configured to receive and mate with the annular inlet 56 of the exhaust manifold 50. The forward flange 52B is disposed radially outside of the forward opening 52A. The rear flange 52C is disposed opposite the forward flange 52B along an axially extending centerline; e.g., the forward and rear flanges 52B, 52C may be referred to as "axial flanges". The first lateral side opening 52D is configured to receive the first exhaust port 58, and the second lateral side opening 52E is configured to receive the second exhaust port 60.

FIG. 6 diagrammatically illustrates a first lateral side (FLS) connecting panel 54 and a second lateral side (SLS) connecting panel 55. The FLS connecting panel 54 includes a first exhaust port connecting flange 54A, a first transition segment 54B, and an first lateral side outer duct flange 54C. The SLS connecting panel 55 includes a second exhaust port connecting flange 55A, a second transition segment 55B, and a second lateral side outer duct flange 55C. As can be seen in the assembled turbine exhaust duct embodiment shown in FIG. 3, the first exhaust port connecting flange 54A is attached to the first exhaust port 58; e.g., attached by weldment. FIG. 3 also illustrates the first lateral side outer duct flange 54C attached to the wall panel 52F of the outer duct 52; e.g., attached by weldment. The SLS connecting panel 55 is disposed in the same manner as the FLS connecting panel 54 except on the opposite side of the turbine exhaust duct 44.

The turbine exhaust duct embodiment shown in FIG. 3, with the components shown in FIGS. 4-6, is a structural member of the gas turbine engine 20. As a structural member, it is subject to operational loads; e.g., at the forward flange 52B, or the rear flange 52C, or both. Operational loads of sufficient magnitude can produce deformation of the turbine exhaust duct 44 and consequent stresses in regions of the turbine exhaust duct 44. In addition, operational loads and consequent deformation of the turbine exhaust duct 44 can create misalignment within or between components connected to the turbine exhaust duct 44; e.g., radial clearances for rotational components. Turbine exhaust ducts that include opposing lateral exhaust ports may exhibit a decreased degree of structural stiffness due to the opposing lateral exhaust ports.

In some instances, it may be possible to increase the stiffness of a turbine exhaust duct by increasing the wall thickness of the duct components. Increasing the stiffness of a turbine exhaust duct in this manner, however, would likely produce a prohibitively heavy turbine exhaust duct.

Figure 7:
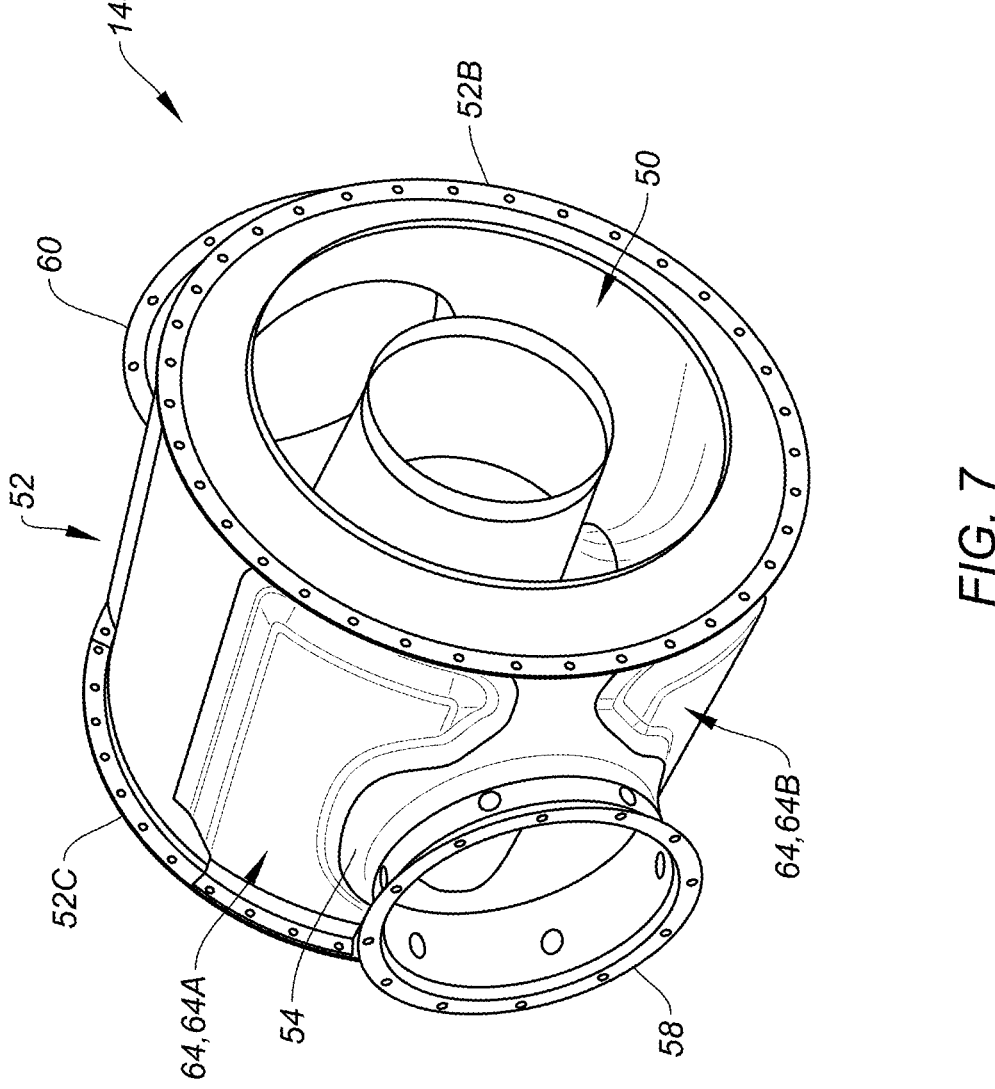
FIG. 7 illustrates a present disclosure turbine exhaust duct embodiment.
Figures 8, 8A, 9:
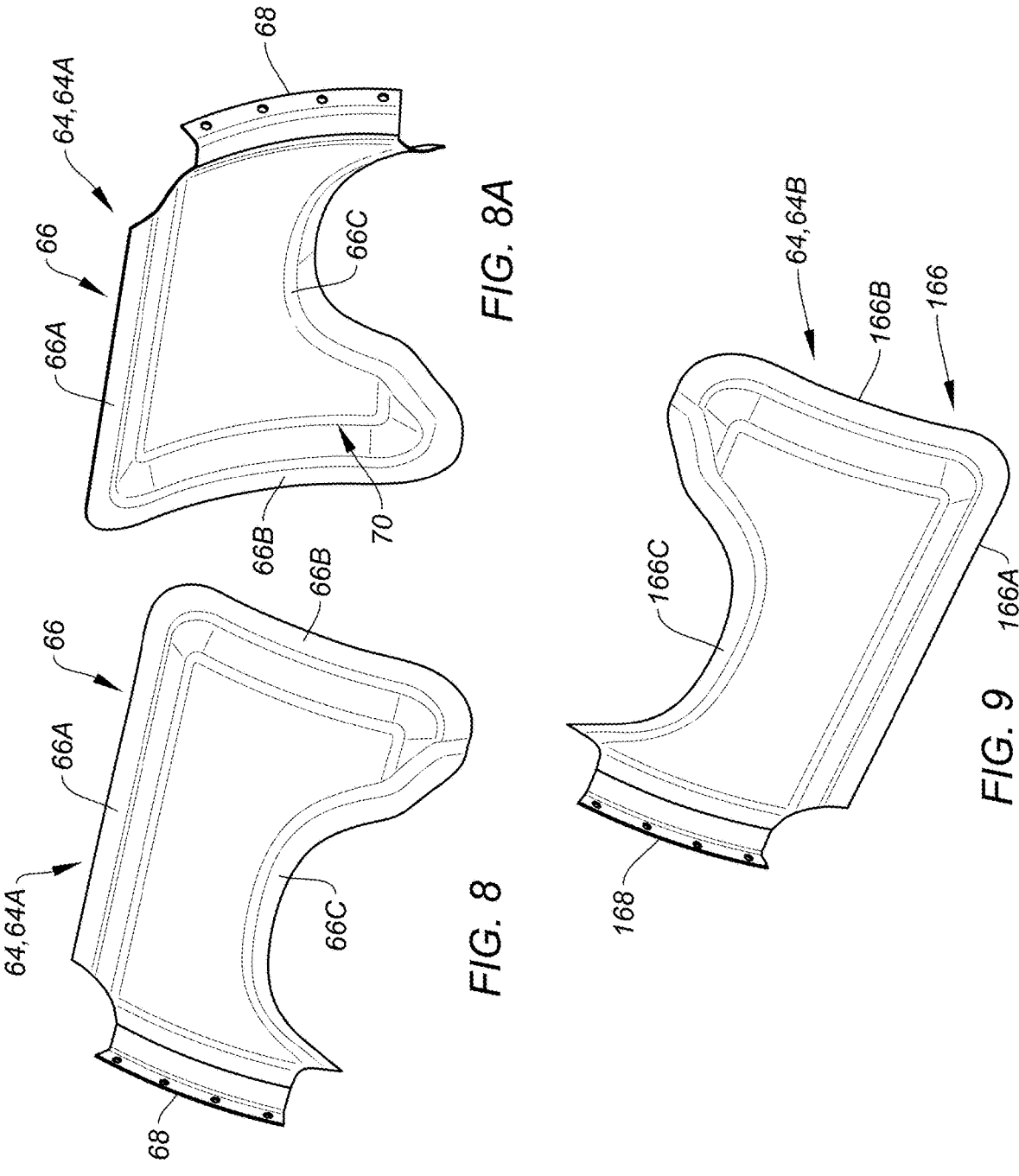
FIG. 8 is a diagrammatic perspective outside view of a present disclosure stiffener panel embodiment.
FIG. 8A is a diagrammatic perspective view of the opposite side of the stiffener panel shown in FIG. 8.
FIG. 9 is a diagrammatic perspective view of a present disclosure stiffener panel embodiment.

Embodiments of the present disclosure are directed to a turbine exhaust duct with substantially improved mechanical stiffness that is understood to overcome deficiencies of the prior art. FIG. 7 illustrates a turbine exhaust duct 144 according to the present disclosure that includes a plurality of stiffener panels 64. It can be seen from FIG. 7 that the turbine exhaust duct 144 includes an upper first lateral side (FLS) stiffener panel 64A and a lower FLS stiffener panel 64B. As will be detailed herein, the turbine exhaust duct 144 may also include an upper second lateral side (SLS) stiffener panel 64C and a lower SLS stiffener panel 64D; e.g., see FIG. 10A. FIG. 8 is a diagrammatic perspective view of the upper FLS stiffener panel 64A shown in FIG. 7. FIG. 8A is a diagrammatic perspective view of the opposite side of the upper FLS stiffener panel shown in FIG. 8. FIG. 9 is a diagrammatic perspective view of the lower FLS stiffener panel shown in FIG. 7.

The upper FLS stiffener panel 64A embodiment shown in FIGS. 8 and 8A includes a flange 66 that extends almost all the periphery of the panel 64A. The flange 66 includes an axially extending upper segment 66A (e.g., an "axial segment"), a circumferentially extending side segment 66B, and an exhaust port segment 66C that extends circumferentially around a portion of the exhaust port 58. The upper FLS stiffener panel 64A embodiment further includes a fastener flange 68 (disposed opposite the flange side segment 66B) configured for attachment to the rear flange 52C of the outer duct 52 (see FIG. 7). The upper and side segments 66A, 66B of the flange 66 are attached to the outer duct 52; e.g., by weldment. The exhaust port segment 66C of the flange 66 is attached to the first lateral side connecting panel 54; e.g., by weldment. The fastener flange 68 may be attached to the rear flange 52C of the outer duct 52 by fasteners.

As can be seen in FIGS. 8 and 8A, the upper FLS stiffener panel 64A embodiment may be configured to form an internal cavity 70 when attached to the turbine exhaust duct. The internal cavity 70 is defined by the outer duct 52, the first lateral side connecting panel 54, and the upper FLS stiffener panel 64A; i.e., when the upper FLS stiffener panel 64A is attached to the outer duct 52 and the first lateral side connecting panel 54, a substantial portion of the FLS stiffener panel 64A is separated from the outer duct 52 and the first lateral side connecting panel 54 thereby forming the internal cavity 70.

The lower FLS stiffener panel 64B embodiment shown in FIG. 9 is configured similar to the upper FLS stiffener panel 64A described above, e.g., the lower FLS stiffener panel 64B includes a flange 166 that extends around substantially all of the periphery of the panel 64B, including a lower segment 166A, a side segment 166B, and an exhaust port segment 166C, as well as a fastener flange 168 configured for attachment to the rear flange 52C of the outer duct 52. The lower segment 166A and at least a portion of the side segment 166B of the flange 166 are attached to the outer duct 52; e.g., by weldment. The exhaust port segment 166C of the flange 166 is attached to the first lateral side connecting panel 54; e.g., by weldment. The fastener flange 168 may be attached to the rear flange 52C of the outer duct 52 by fasteners.

Figures 10, 10A:
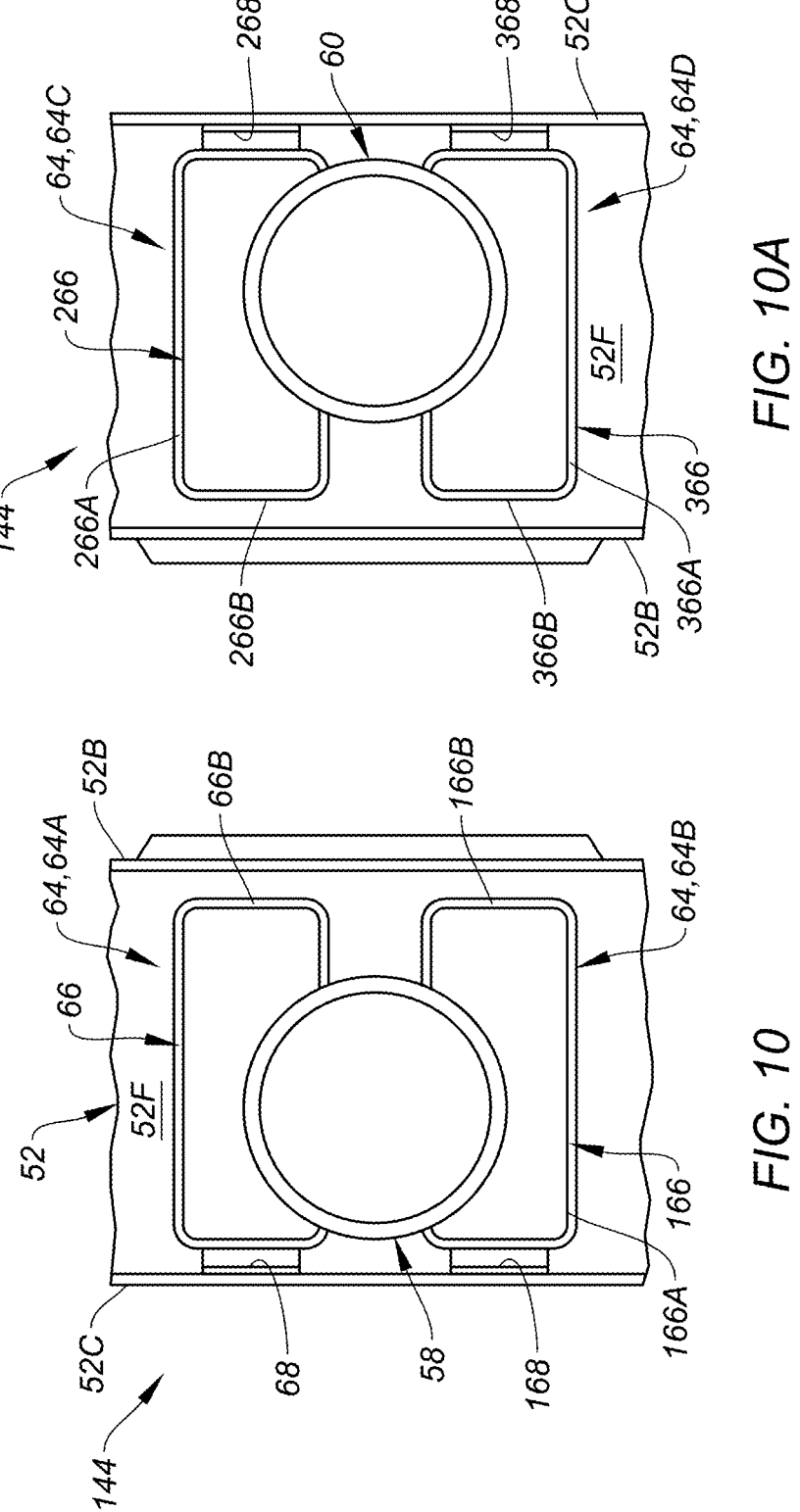
FIG. 10 is a diagrammatic planar view of a first lateral side of a present disclosure turbine exhaust duct embodiment.
FIG. 10A is a diagrammatic planar view of a second lateral side of the present disclosure turbine exhaust duct embodiment shown in FIG. 10.

FIG. 10 is a diagrammatic planar view of the first lateral side of the turbine exhaust duct 144 embodiment shown in FIG. 7, illustrating the upper FLS stiffener panel 64A disposed above the first exhaust port 58 and the lower FLS stiffener panel 64B disposed below the first exhaust port 58. FIG. 10A is a diagrammatic planar view of the second lateral side of the turbine exhaust duct 144 embodiment, illustrating the upper SLS stiffener panel 64C disposed above the second exhaust port 60 and the lower SLS stiffener panel 64D disposed below the second exhaust port 60. The upper SLS stiffener panel 64C may be a mirror configuration of the upper FLS stiffener panel 64A; e.g., the upper SLS stiffener panel 64C includes a flange 266 that includes an upper segment 266A, a side segment 266B, an exhaust port segment (not shown), and a fastener flange 268. The lower SLS stiffener panel 64D may be a mirror configuration of the lower FLS stiffener panel 64B; e.g., the lower SLS stiffener panel 64D includes a flange 366 that includes a lower segment 366A, a side segment 366B, an exhaust port segment (not shown), and a fastener flange 368. In the turbine exhaust duct 144 embodiment shown in FIGS. 10 and 10A, the upper FLS stiffener panel 64A, the lower FLS stiffener panel 64B, the upper SLS stiffener panel 64C, and the lower SLS stiffener panel 64D are all configured with a fastener flange disposed for attachment to the rear flange 52C of the outer duct 52 by fasteners.

Figures 11, 11A:
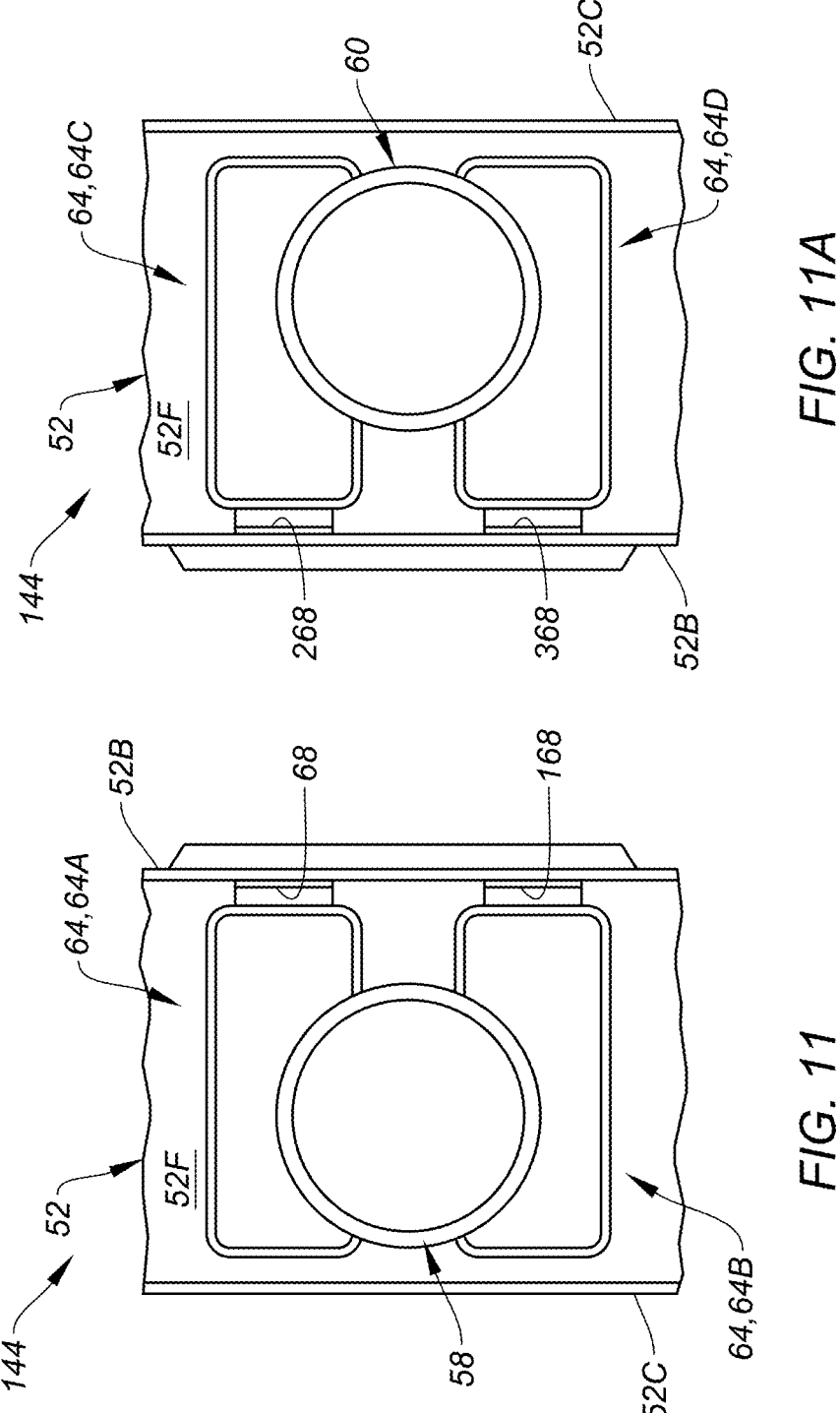
FIG. 11 is a diagrammatic planar view of a first lateral side of a present disclosure turbine exhaust duct embodiment.
FIG. 11A is a diagrammatic planar view of a second lateral side of the present disclosure turbine exhaust duct embodiment shown in FIG. 11.
Figures 12, 12A:
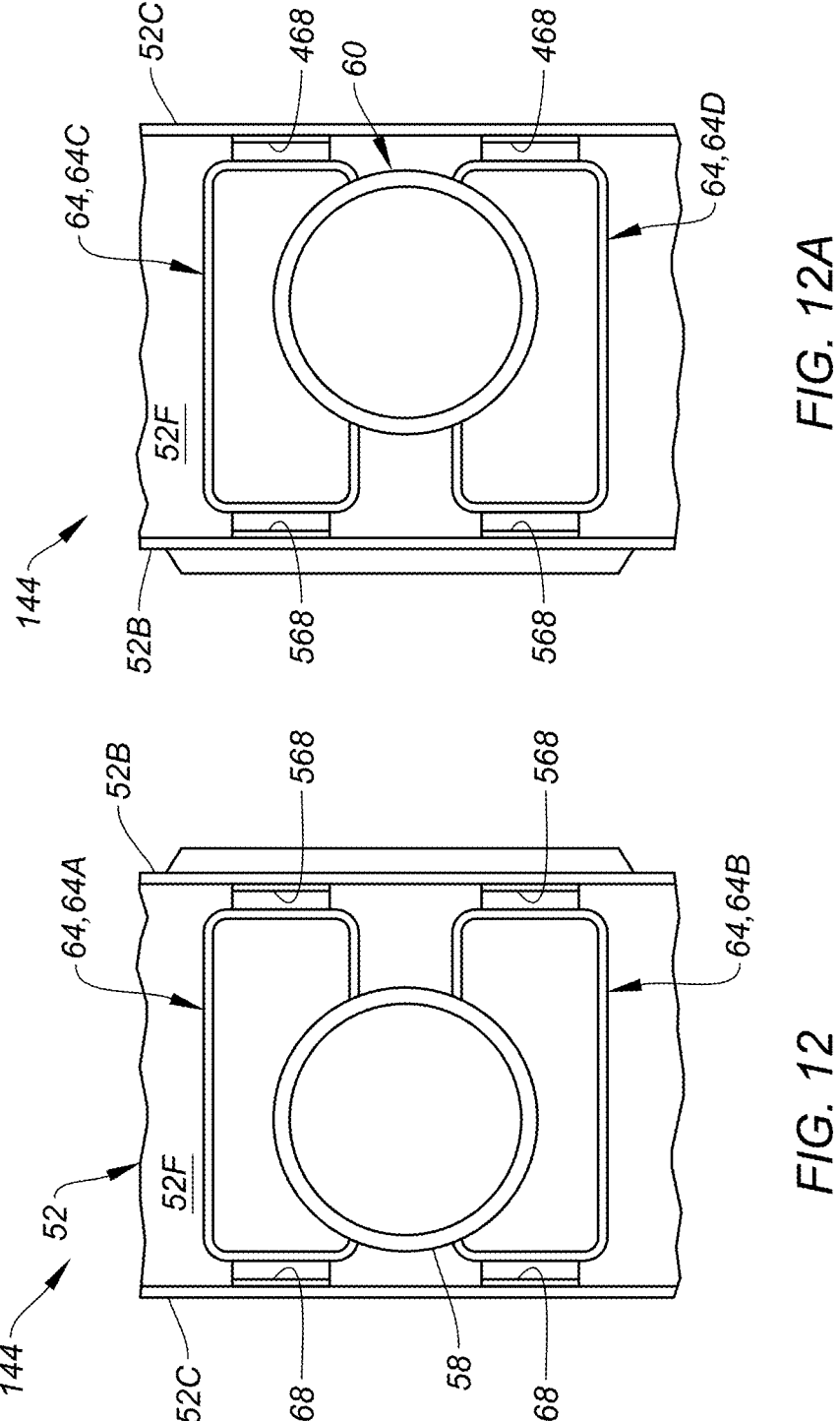
FIG. 12 is a diagrammatic planar view of a first lateral side of a present disclosure turbine exhaust duct embodiment.
FIG. 12A is a diagrammatic planar view of a second lateral side of the present disclosure turbine exhaust duct embodiment shown in FIG. 12.

The present disclosure is not limited to stiffener panels 64 that are configured for attachment to the rear flange 52C of the outer duct 52. For example, FIGS. 11 and 11A illustrate an embodiment wherein the upper FLS stiffener panel 64A, the lower FLS stiffener panel 64B, the upper SLS stiffener panel 64C, and the lower SLS stiffener panel 64D are all configured with a fastener flange 68, 168, 268, 368 disposed for attachment to the forward flange 52B of the outer duct 52 by fasteners. As another example, FIGS. 12 and 12A illustrate an embodiment wherein the upper FLS stiffener panel 64A, the lower FLS stiffener panel 64B, the upper SLS stiffener panel 64C, and the lower SLS stiffener panel 64D are all configured with a first fastener flange 468 disposed for attachment to the rear flange 52C of the outer duct 52 by fasteners, and a second fastener flange 568 disposed for attachment to the forward flange 52B of the outer duct 52 by fasteners.

FIGS. 10-12A illustrate stiffener panels 64A, 64B disposed above and below the first exhaust port 58 disposed on the first lateral side of the turbine exhaust duct 144, and stiffener panels 64C, 64D disposed above and below the second exhaust port 60 disposed on the second lateral side of the turbine exhaust duct 144. In some applications (e.g., low loading/stress applications), it may be fewer stiffener panels 64 may be used to achieve the desired turbine exhaust duct 144 stiffness; e.g., use only an upper FLS stiffener panel 64A and an upper SLS stiffener panel 64C, or use only a lower FLS stiffener panel 64B and a lower SLS stiffener panel 64D.

The present disclosure stiffener panels are understood to greatly enhance the stiffness of the turbine exhaust duct 144, while adding minimal weight. For example, the connection between the peripheral flange 66, 166, 266, 366 of the stiffener panel 64A, 64B, 64C, 64D and the outer duct 52/lateral side connecting panel 54, 55 provides structural load paths that enhance the overall rigidity of the assembly. The connection between the fastener flange(s) 68, 168, 268, 368 and the outer duct 52 also provides a structural load path that enhances the overall rigidity of the assembly. The present disclosure stiffener panels 64 are also understood to enhance vibrational response and to reduce thermal stress.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/ or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A turbine exhaust duct for a gas turbine engine, the turbine exhaust duct comprising:

an exhaust manifold that includes an annular inlet disposed at a first axial end of the exhaust manifold, a first exhaust port disposed on a first lateral side of the exhaust manifold, and a second exhaust port disposed on a second lateral side of the exhaust manifold;

an outer duct that includes a wall panel that extends axially between a first axial flange and a second axial flange, an axial end aperture disposed adjacent the first axial flange, a first lateral side aperture disposed in the wall panel, and a second lateral side aperture disposed in the wall panel;

a first connecting panel includes a first exhaust port connecting flange and a first lateral side outer duct flange, wherein the first exhaust port connecting flange is attached to the first exhaust port, and the first lateral side outer duct flange is attached to the outer duct wall panel;

a second connecting panel includes a second exhaust port connecting flange and a second lateral side outer duct flange, wherein the second exhaust port connecting flange is attached to the second exhaust port, and the second lateral side outer duct flange is attached to the outer duct wall panel;

at least one first stiffener panel (FSP) having a FSP periphery flange, wherein the FSP periphery flange is attached to the first connecting panel and to the outer duct wall panel; and at least one second stiffener panel (SSP) having a SSP periphery flange, wherein the SSP periphery flange is attached to the first connecting panel and to the outer duct wall panel.

2. The turbine exhaust duct of claim 1, wherein the first exhaust port and the second exhaust port are disposed laterally opposite one another; and;

wherein the exhaust manifold is configured to direct gas flow received by the annular inlet into both the first exhaust port and the second exhaust port; and wherein the annular inlet of the exhaust manifold is received within the axial end aperture, the first exhaust port is received within the first lateral side aperture, and the second exhaust port is received within the second lateral side aperture.

3. The turbine exhaust duct of claim 1, wherein the at least one first stiffener panel includes an upper first stiffener panel and a lower first stiffener panel, and the upper first stiffener panel and the lower first stiffener panel are disposed on opposite circumferential sides of the first exhaust port.

4. The turbine exhaust duct of claim 3, wherein the at least one second stiffener panel includes an upper second stiffener panel and a lower second stiffener panel, and the upper second stiffener panel and the lower second stiffener panel are disposed on opposite circumferential sides of the second exhaust port.

5. The turbine exhaust duct of claim 1, wherein the FSP periphery flange includes an axial segment, a side segment, and an exhaust port segment;

wherein the axial segment and the side segment are attached to the outer duct wall panel; and wherein the exhaust port segment is attached to the first connecting panel.

6. The turbine exhaust duct of claim 5, wherein the axial segment and the side segment are disposed along a periphery of the at least one first stiffener panel.

7. The turbine exhaust duct of claim 6, wherein the at least one first stiffener panel further includes a fastener flange engaged with the second axial flange of the outer duct.

8. The turbine exhaust duct of claim 6, wherein the at least one first stiffener panel further includes a fastener flange engaged with the first axial flange of the outer duct.

9. The turbine exhaust duct of claim 1, wherein the FSP periphery flange includes an axial segment and an exhaust port segment, and the at least one first stiffener panel further includes a first fastener flange and a second fastener flange;

wherein the axial segment is attached to the outer duct wall panel; and wherein the exhaust port segment is attached to the first connecting panel; and wherein the first fastener flange is engaged with the first axial flange of the outer duct, and the second fastener flange is engaged with the second axial flange of the outer duct.

10. The turbine exhaust duct of claim 1, wherein the at least one first stiffener panel is configured such that an internal cavity is defined by the at least one first stiffener panel, the outer duct, and the first connecting panel.

11. A turbine exhaust duct for a gas turbine engine, the turbine exhaust duct comprising:

an exhaust manifold that includes an annular inlet, a first exhaust port disposed on a first lateral side of the exhaust manifold, and a second exhaust port disposed on a second lateral side of the exhaust manifold;

an outer duct that includes a wall panel that extends axially between a first axial flange and a second axial flange, wherein the wall panel defines an interior compartment of the outer duct;

wherein the exhaust manifold is disposed within the interior compartment of the outer duct so that the first exhaust port extends laterally outward from a first lateral side of the outer duct and the second exhaust port extends laterally outward from a second lateral side of the outer duct;

a first connecting panel extending between and attached to the first exhaust port and the outer duct wall panel;

a second connecting panel extending between and attached to the second exhaust port and the outer duct wall panel;

at least one first stiffener panel (FSP) having a FSP periphery flange, wherein the FSP periphery flange is attached to the first connecting panel and to the outer duct wall panel; and at least one second stiffener panel (SSP) having a SSP periphery flange, wherein the SSP periphery flange is attached to the first connecting panel and to the outer duct wall panel.

12. The turbine exhaust duct of claim 11, wherein the at least one first stiffener panel includes an upper first stiffener panel and a lower first stiffener panel, and the upper first stiffener panel and the lower first stiffener panel are disposed on opposite circumferential sides of the first exhaust port.

13. The turbine exhaust duct of claim 12, wherein the at least one second stiffener panel includes an upper second stiffener panel and a lower second stiffener panel, and the upper second stiffener panel and the lower second stiffener panel are disposed on opposite circumferential sides of the second exhaust port.

14. The turbine exhaust duct of claim 13, wherein the FSP periphery flange includes an axial segment, a side segment, and an exhaust port segment disposed along a periphery of the at least one first stiffener panel;
    wherein the axial segment and the side segment are attached to the outer duct wall panel; and
    wherein the exhaust port segment is attached to the first connecting panel.

15. The turbine exhaust duct of claim 14, wherein the at least one first stiffener panel further includes a fastener flange engaged with the second axial flange of the outer duct.

16. The turbine exhaust duct of claim 14, wherein the at least one first stiffener panel further includes a fastener flange engaged with the first axial flange of the outer duct.

17. The turbine exhaust duct of claim 13, wherein the FSP periphery flange includes an axial segment and an exhaust port segment, and the at least one first stiffener panel further includes a first fastener flange and a second fastener flange;
    wherein the axial segment is attached to the outer duct wall panel; and
    wherein the exhaust port segment is attached to the first connecting panel; and
    wherein the first fastener flange is engaged with the first axial flange of the outer duct, and the second fastener flange is engaged with the second axial flange of the outer duct.

18. The turbine exhaust duct of claim 13, wherein the at least one first stiffener panel is configured such that an internal cavity is defined by the at least one first stiffener panel, the outer duct, and the first connecting panel.

19. A gas turbine engine, comprising:
    a compressor;
    a combustor;
    a turbine in communication with the compressor; and
    a turbine exhaust duct disposed downstream of the turbine, the turbine exhaust duct comprising:

an exhaust manifold that includes an annular inlet, a first exhaust port disposed on a first lateral side of the exhaust manifold, and a second exhaust port disposed on a second lateral side of the exhaust manifold;
    an outer duct that includes a wall panel that extends axially between a first axial flange and a second axial flange, wherein the wall panel defines an interior compartment of the outer duct;
    wherein the exhaust manifold is disposed within the interior compartment of the outer duct so that the first exhaust port extends laterally outward from a first lateral side of the outer duct and the second exhaust port extends laterally outward from a second lateral side of the outer duct;
    a first connecting panel extending between and attached to the first exhaust port and the outer duct wall panel;
    a second connecting panel extending between and attached to the second exhaust port and the outer duct wall panel;
    at least one first stiffener panel (FSP) having a FSP periphery flange, wherein the FSP periphery flange is attached to the first connecting panel and to the outer duct wall panel; and
    at least one second stiffener panel (SSP) having a SSP periphery flange, wherein the SSP periphery flange is attached to the first connecting panel and to the outer duct wall panel.

20. The gas turbine engine of claim 19, wherein the at least one first stiffener panel includes an upper first stiffener panel and a lower first stiffener panel, and the upper first stiffener panel and the lower first stiffener panel are disposed on opposite circumferential sides of the first exhaust port; and
    wherein the at least one second stiffener panel includes an upper second stiffener panel and a lower second stiffener panel, and the upper second stiffener panel and the lower second stiffener panel are disposed on opposite circumferential sides of the second exhaust port.

* * * * *